Feb. 14, 1956     A. W. JEWETT     2,734,777
ROLLER SKATE WHEEL
Filed Feb. 8, 1951
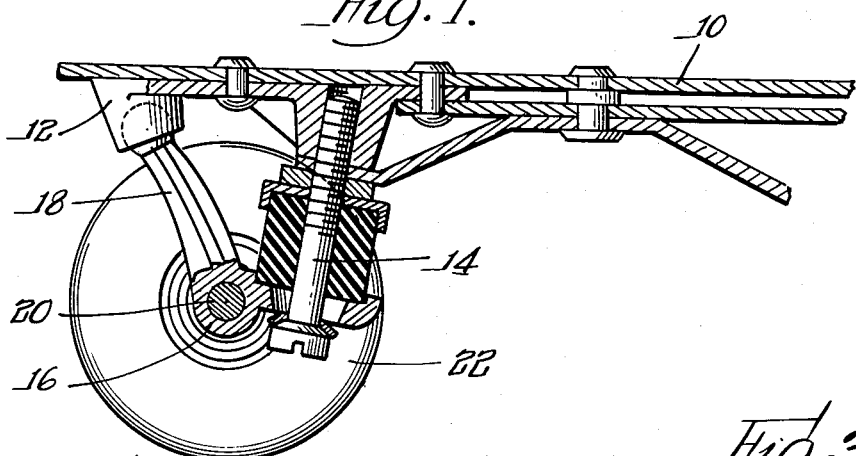
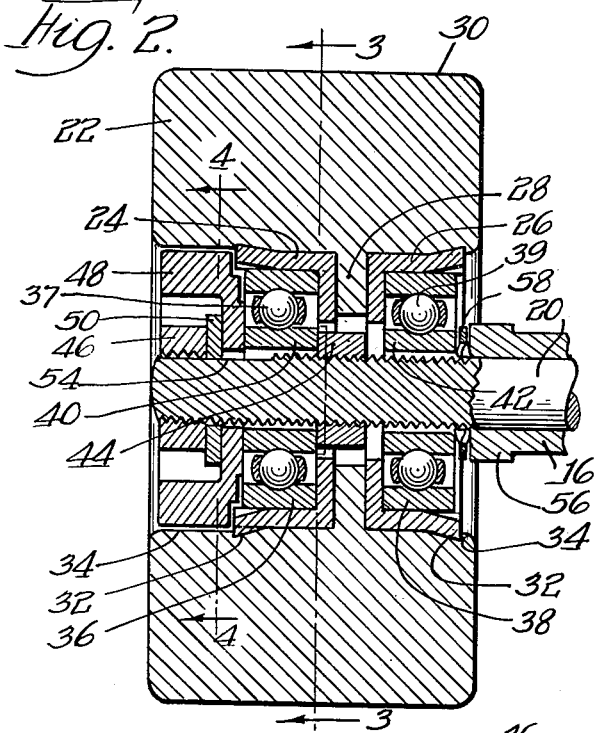
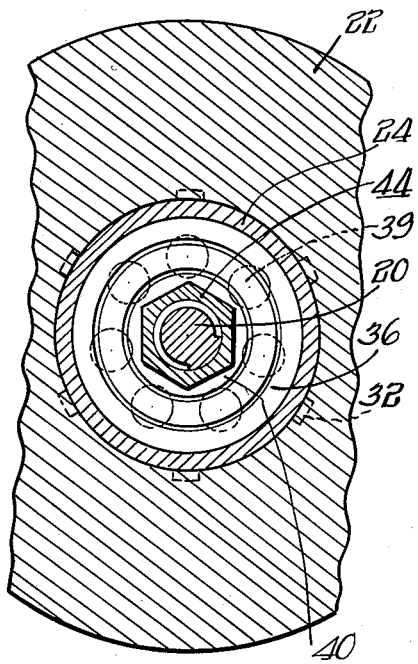
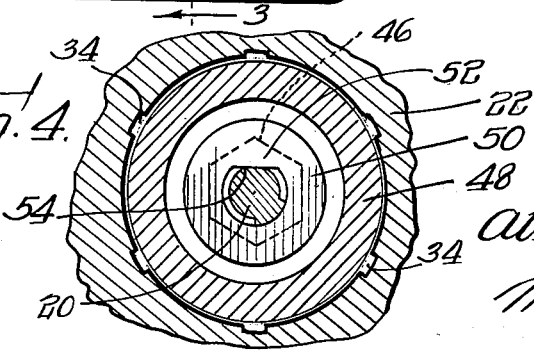
INVENTOR.
Alfred W. Jewett
BY
Moore, Olson & Trexler
attys.

United States Patent Office 2,734,777
Patented Feb. 14, 1956

2,734,777

ROLLER SKATE WHEEL

Alfred W. Jewett, Chicago, Ill., assignor to Chicago Roller Skate Company, Chicago, Ill., a corporation of Arizona Application February 8, 1951, Serial No. 210,039

9 Claims. (Cl. 301—5.7)

This invention relates to roller skates, and concerns particularly the wheel structures thereof.

Roller skates of the better grade commonly employ ball bearings in the mounting of the wheels upon the truck axles. For stability generally it is desirable to employ two bearings in juxtaposed relationship within each wheel structure.

These bearings, in the use of the skate, are called upon to withstand appreciable and prolonged radial loads, but generally speaking, the thrust or axial loads imparted thereto are not of great magnitude or of prolonged duration. Accordingly, in the interest of economy it is desirable to employ bearings which will absorb radial loads efficiently, although not adapted to withstand thrust loading to a substantial or appreciable extent.

In the mounting of such roller or ball bearings within the roller skate wheel structures, various expedients have been resorted to and employed to avoid imparting an initial end thrust or load to the bearings as an incident to the assembly operations, while still providing a relatively tight structure free of undesired end play. One such expedient, employed in the past, has been the mounting of a spacer on the truck axle between the inner races of the bearings, this spacer being of the same thickness as the spacing means provided on the rotary wheel lying between and thus acting to space the outer races of the bearings. Such an arrangement maintains the outer and inner races of the bearings in the same spaced apart relationship, thus avoiding the imparting of an initial end thrust to the balls and raceways, incident to the assembly operations. However, certain difficulties are encountered in the manufacture of the spacers, in constructions of the foregoing type, in that the spacers must be accurately made, at high cost; and even where accuracy in the spacer dimensions is maintained, difficulties may nonetheless be encountered due to variations in the size of the spacing means on the wheel structure between the outer bearing races, resulting from various factors, difficult or impossible to control.

In accordance with the present invention a bearing arrangement is provided, in a roller skate wheel structure, which avoids the foregoing difficulties, and which permits the mounting of adjacent bearings in position, without undesired initial end thrust loading, but also without undesired end play, and in an economical and low cost manner.

It is an object of the present invention to provide a roller skate wheel structure of improved construction and improved operating characteristics.

More particularly stated, it is an object of the present invention to provide an improved roller skate wheel structure, wherein ball or other antifriction bearings may be mounted in juxtaposed relationship upon the wheel axles, with a minimum of end play, but without end thrust preloading, and in an economical manner.

A still further object of the invention is to provide a simplified and improved roller skate wheel structure employing ball or roller bearings in juxtaposition, and wherein the parts may be more readily fabricated and assembled, at minimum cost; and wherein adjustments may be made to accommodate variations in the positioning of the outer raceway holding means of the wheel due to manufacturing variations, wear, or other factors which may be encountered.

Various other objects, advantages and features of the invention will be apparent from the following specification when taken in connection with the accompanying drawings, wherein one preferred embodiment is set forth for purposes of illustration.

In the drawings, wherein like reference numerals refer to like parts throughout:

Fig. 1 is a fragmentary view of a roller skate incorporating a wheel structure constructed in accordance with and embodying the principles of the present invention;

Fig. 2 is an enlarged vertical sectional view through the wheel structure comprising a part of the roller skate shown in Fig. 1;

Fig. 3 is a transverse sectional view of the structure of Fig. 2, on the line 3—3 thereof; and Fig. 4 is a partial transverse sectional view, of the structure of Fig. 2, on the line 4—4 thereof.

Referring more particularly to the drawings, in Fig. 1 a partial roller skate structure is illustrated comprising a sole or frame plate 10 to which a skate shoe or the like may be fastened. The sole plate 10 is adapted to carry hanger brackets for the front and rear wheel assemblies, the front wheel hanger bracket being illustrated in Fig. 1, and identified by the numeral 12. This hanger bracket forms the support for a kingpin 14, the lower end of which forms the support for the wheel truck 16 having an arm 18 interconnecting with the hanger bracket in a ball and socket connection, and carrying a wheel axle 20 press fitted therein.

The wheel axle rotatably carries a pair of wheels, one of which is illustrated at 22 in Figs. 1 and 2.

Referring more particularly to Fig. 2, and to the structure provided by the present invention, the wheel structure illustrated comprises, in addition to the wheel body 22, which may be of wood, fiber, or the like, a pair of metal retainer rings 24 and 26, maintained in predetermined spaced relation by an inwardly projecting flange portion 28 of the wheel body disposed therebetween.

In mounting the retainer rings 24 and 26 in position, the bored wheel body may be conveniently gripped along its outer annular surface 30, by means of a suitable jig or fixture. The rings are then press fitted into position, and the bearing receiving surfaces thereof machined. By this means the bearing holding surfaces of the retainer rings are concentrically formed in relation to the outer annular surface 30 of the wheel. The rings are provided with radially projecting teeth, as indicated at 32, so that as they are press fitted into the chambers of the body, retainer grooves 34 are formed in the body material, holding the retainer rings 24 and 26 firmly in position from either rotary or axial displacement.

The retainer rings form the support for the outer race members 36 and 38, respectively, of a pair of antifriction bearings 37 and 39, specifically ball bearings in the embodiment illustrated, disposed in juxtaposed relationship within the wheel body. The inner race members of the bearings, as indicated at 40 and 42, are disposed on the non-rotatable truck axle 20, preferably in slightly loosely embracing relation therewith.

In accordance with the present invention the truck axle 20 is threaded substantially along its entire length within the wheel structure, and threadedly carries at an intermediate point thereon an inner clamping nut 44. Co-operable with the inner clamping nut is an outer clamping nut 46, there being arranged therebetween, in addition to the bearing race 40, a dust cap member 48 and a D-washer 50. This D-washer has a chord or projecting portion 52 cooperable with a flattened axle portion 54, Figs. 2 and 4, so as to maintain the washer against rotation.

Arranged between the inner raceway 42 of the inner bearing structure 39 and the end 56 of the wheel truck is a lock washer 58, which may be of any suitable type, but which is illustrated in the specific embodiment shown as being of twisted toothed construction.

In the assembly of the wheel structure, the inner ball bearing 39 is mounted within the retainer ring 26 of the wheel, the outer raceway 38 thereof preferably having a relatively snug fit within the retainer ring member. Lock washer 58 is mounted in position, and the assembled wheel and inner bearing is then slipped into position upon the truck axle. The inner clamping nut 44 is then threaded onto the shaft or axle 20, to the position shown in Fig. 2, after which the outer bearing 37 is pushed into the retainer ring 24, the outer raceway 36 of the bearing having a snug fit, but not a press fit, into the retainer ring, as shown. The dust cap 48, D-washer 50, and outer clamping nut are then assembled upon the axle, so that upon tightening of the clamping nut 46 the inner raceway 40 of the outer bearing is clamped firmly against the inner clamping nut 44.

If the clamping nut 44 has been properly positioned, the tightening of the cooperable clamping nut 46, reacting through the raceways 36 and 38, and the associated retainer rings 24 and 26, will bring the inner raceway 42 of the inner bearing lightly into contact with the lock washer 58, sufficient to prevent rotation of the raceway 42 when the skate is in use, and sufficient to prevent looseness or end play in the structure, but insufficient to apply any substantial or undesired end thrust preloading to the ball bearings. More specifically, the two clamping nuts 44 and 46 accurately position the raceway 40 of the outer bearing 37, and this in turn positions both bearings and the wheel body, including the inner raceway 42 of the inner bearing structure, in a manner so as to effect the results stated. If upon tightening of the clamping nut 46 the desired positioning has not been accomplished, the clamping nut 46 and the outer bearing 37 may be removed, and the inner clamping nut 44 readjusted in its position, until the desired cooperation is secured. The threaded interconnection between the truck axle and the nut 44 permits the accurate positioning of the latter, to effect the desired cooperation of the parts, even though the structures may have been fabricated at low cost, and within relatively wide limits and tolerances in the various machining operations.

It will be seen that in the structure thus provided, the retainer rings 24 and 26, which have been accurately positioned in accordance with the contact surface 30 of the wheel body, effect the radial positioning of the bearings; whereas the adjustment of the nut 44 provides a ready means by which a proper axial positioning of the two bearings may be effected, to avoid end play while at the same time preventing undesired end thrust preloading of the radial type bearings. The lock washer 58 precludes rotation of the raceway 42 in the use of the skate, so that any variations in the width of the raceway will not disrupt the adjustment of the parts. In other words, when the parts have been assembled and adjusted for use, the pressure contact between raceway 42 and the lock washer 58 remains invariable and fixed at the predetermined adjusted value. In the operation of the structure, in use, the D-washer 50, dust cap 48, and the clamping nuts 44—46 and raceway 40 all remain non-rotatable and in fixed position upon the truck axle, precluding any looseness or wobble in the structure.

It will be seen that the invention provides a low cost structure by which accuracy may be obtained in the assembly and adjustment of the parts. In accordance with the structure provided, variations in the thickness of the wheel body flange 28, or in the thickness or positioning of the retainer rings 24 and 26, or in the size of the bearing races may be readily compensated for by the adjustment and positioning of the clamping nut 44, so as to provide a desired cooperation between the parts.

It is obvious that various changes may be made in the specific embodiment set forth for purposes of illustration without departing from the spirit of the invention. The invention is accordingly not to be limited to the specific structures shown and described, but only as indicated in the following claims.

The invention is hereby claimed as follows:

1. A roller skate wheel assembly comprising a wheel body, a support axle, a pair of antifriction bearings rotatably supporting the wheel body on said axle and disposed in predetermined spaced relation within said body, and means for adjustably axially positioning the bearings in respect to the axle, said positioning means comprising a pair of abutment members adjustably anchored to the axle in predetermined spaced position thereon, said members being disposed on opposite sides of one of the bearings and one of said members being positioned between the bearings to effect the positioning of said one bearing, and through said bearing to effect the positioning of both bearings relative to said axle.

2. A roller skate wheel assembly as defined in claim 1, wherein means is provided for individually adjusting the position of said abutment members axially of the axle.

3. A roller skate wheel assembly as set forth in claim 1 wherein the pair of abutment members clamp one of the bearings between them, and the abutment member positioned between the bearings is spaced from the other bearing.

4. A roller skate wheel assembly comprising a wheel body, a support axle, a pair of antifriction bearings rotatably supporting the wheel body on said axle, spacing means carried by the wheel body for positioning the bearings in predetermined spaced relation therewithin, and means for axially positioning the bearings in respect to the axle, said positioning means comprising a pair of clamping members adjustably anchored to the axle in predetermined spaced position thereon, said members being disposed on opposite sides of one of the bearings with one of said members positioned between said bearings adjustably to effect the positioning of said one bearing, and through said one bearing to effect the positioning of both bearings relative to said axle.

5. A roller skate wheel assembly as defined in claim 4, wherein said clamping members comprise threaded nuts threaded onto the axle in predetermined position thereon.

6. A roller skate wheel assembly as set forth in claim 4 wherein said clamping members clamp one of the bearings between them, and the member positioned between the bearings is spaced from the other bearing.

7. A roller skate wheel assembly comprising a wheel body, a support axle, a pair of antifriction bearings rotatably supporting the wheel body on said axle and disposed in predetermined spaced relation within said body, and means for axially positioning the bearings in respect to the axle, said positioning means comprising a pair of nuts threaded onto the axle at a predetermined spaced position thereon, said nuts being in clamping engagement with the inner raceway of the first of the bearings to effect the positioning thereof, an abutment on the axle, and a lock washer between said abutment and the inner raceway of the second bearings, whereby said latter raceway is retained non-rotatably on the axle and is positioned by the positioning of the raceway of the first bearing by said nuts.

8. A roller skate wheel assembly comprising a wheel body, a support axle, a pair of antifriction bearings rotatably supporting the wheel body on said axle and disposed in predetermined spaced relation within said body, and means for axially positioning the bearings in respect to the axle, said positioning means comprising a pair of clamping nuts threaded onto the axle on opposite sides of the first of said bearings in clamping engagement therewith to effect the positioning thereof, one of said nuts being positioned between said bearings, and a dust cap and D-washer disposed between one of said nuts and said first bearing, said nuts serving to position said first bearing and therethrough to position the second bearing axially on said support axle.

9. A roller skate wheel assembly comprising a wheel body, a support axle, a pair of anti-friction bearings rotatably supporting the wheel body on said axle and disposed in predetermined spaced relation within said body, and means for axially positioning the bearings in respect to the axle, said positioning means comprising a pair of nuts threaded onto the axle at a predetermined spaced position thereon, said nuts being in clamping engagement with the inner raceway of the first of the bearings to effect the positioning thereof, the second bearing being positioned by the positioning of the raceway of the first bearing by said nuts, and means restraining the inner raceway of the second bearing against rotation on the axle.

References Cited in the file of this patent

UNITED STATES PATENTS

| | | |
|---|---|---|
| 1,903,776 | Clark | Apr. 18, 1933 |
| 2,152,684 | Grange | Apr. 9, 1939 |
| 2,261,465 | Grange | Nov. 4, 1941 |
| 2,300,444 | Ware | Nov. 3, 1942 |
| 2,345,258 | Hirschmugl | Mar. 28, 1944 |
| 2,349,281 | Kendall | May 23, 1944 |
| 2,440,650 | Batesole | Apr. 27, 1948 |
| 2,476,193 | Hirschmugl | July 12, 1949 |
| 2,484,974 | Van Horn | Oct. 18, 1949 |

FOREIGN PATENTS

| | | |
|---|---|---|
| 365,408 | Great Britain | Jan. 21, 1932 |
| 765,697 | France | Mar. 26, 1934 |